United States Patent [19]

Rey

[11] 4,312,238

[45] Jan. 26, 1982

[54] ELECTRO-ACOUSTIC FLOWMETER

[76] Inventor: Thomas J. Rey, 319 Nashua Rd., Bedford, Mass. 01730

[21] Appl. No.: 103,100

[22] Filed: Dec. 13, 1979

[51] Int. Cl.³ ............................................... G01F 1/66
[52] U.S. Cl. .............................. 73/861.28; 73/861.29
[58] Field of Search ........... 73/861.27, 861.28, 861.29, 73/597

[56] References Cited

U.S. PATENT DOCUMENTS

| | | | |
|---|---|---|---|
| 2,991,650 | 7/1961 | Katzenstein et al. | 73/861.28 |
| 3,209,591 | 10/1965 | Lester et al. | 73/861.29 X |
| 3,568,661 | 3/1971 | Franklin | 73/861.29 X |
| 3,952,578 | 4/1976 | Jacobs | 73/597 X |
| 4,011,755 | 3/1977 | Pedersen et al. | 73/861.28 |
| 4,208,908 | 6/1980 | Hickox | 73/861.26 |

Primary Examiner—Charles A. Ruehl
Attorney, Agent, or Firm—Maurice R. Boiteau

[57] ABSTRACT

Apparatus is provided for measuring the velocity of a fluid, which may be, for example, a liquid, gas, blood or slurry, in a conduit which may, for example, be in the form of a pipe, tube, trough, or vessel. The velocity is measured by transmitting sonic power of frequency varying linearly with time, one electro-acoustic transducer being disposed at an upstream site and a second electro-acoustic transducer at a downstream site. In accordance with the theory of this invention account is taken of the signals in the fluid and also in the walls of the conduit. Associated with the transducers are driving and receiving circuits, the latter performing bandpass-amplification, envelope detection and processing of the fluctuations in the envelopes of the received signals to measure the periods or frequencies in upstream and in downstream transmission and to further determine and display the difference of the periods or frequencies as a voltage or number proportional to fluid velocity.

15 Claims, 15 Drawing Figures

RAMP SWEEP WAVEFORM (TIME DIVISION SYSTEM)

Fig. 6

TRIANGULAR WAVEFORM (TIME DIVISION SYSTEM)

Fig. 7

| COUNT | msb | lsb |
|-------|-----|-----|
| 0 | 0 | 0 |
| 1 | 0 | 1 |
| 2 | 1 | 0 |
| 3 | 1 | 1 |

ELECTRO-ACOUSTIC FLOWMETER

BACKGROUND OF THE INVENTION

The present invention relates in general to the measurement of velocity of a fluid inside a conduit. More particularly, the invention relates to an electro-acoustic flowmeter for measuring fluid velocity in a more accurate manner than known hereinbefore.

The principle of deriving the velocity of a fluid (liquid, gas, slurry, blood) inside of a conduit (pipe, tube, vessel, trough) from the measurement of the differential time delay of upstream and downstream sound or ultrasound is known. See for example, Noble, F. W., The Review of Scientific Instruments, Volume 39, No. 9, September, 1968, pages 1327–1331.

Figure 1:
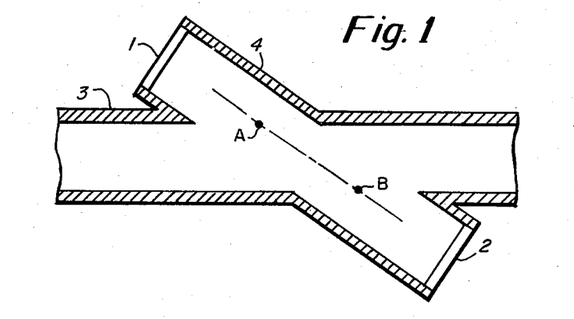
FIGS. 1-3 show three different embodiments for the arrangement of the upstream and downstream transducers with the arrangement of FIG. 1 being invasive and the arrangement of FIGS. 2 and 3 being noninvasive.
Figure 2:
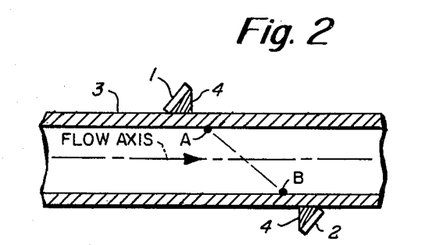

The upstream and downstream transducers, also referred to herein and shown in FIGS. 1 and 2, are typically located on a line intersecting the flow axis obliquely. Described hereinafter are different arrangements for the placement of these transducers. The embodiments provided are either invasive or non-invasive.

Flowmeter design is beset by the problem of soundpaths outside the fluid, sometimes in the nature of reverberations. The following inventors have devised certain systems to overcome these problems.

For example, pulsed operation has been proposed by Cirulis, U.S. Pat. No. 3,720,100, Gassmann, U.S. Pat. No. 4,069,713, and others. While pulsed operation resolves different paths of differential delays substantially greater than pulse width, the latter cannot be narrower than the reciprocal bandwidth (in radians/sec.) of the system. Since acoustic transducers are narrowband structures, the desired resolution is limited at radio frequencies to substantial values of differential path delay. Thus, such systems may suffer from practical limitations on transducer separation.

Another technique is material matching such as proposed by Krylova, U.S. Pat. No. 4,065,958. Yet another technique is shown by Lynnworth, U.S. Pat. No. 4,004,461 which depicts an arrangement of acoustically mismatched pipe sections. Both of these techniques are used in conjunction with collimated beams. Again, the acoustic mismatching of material may not be practical where it creates other problems depending upon the particular environment. Furthermore, these techniques are proposed on the theory of essentially ignoring the signals within the walls of the conduit.

The interferometric principle of the present invention is tolerant of interference by stationary sound paths and by electromagnetic coupling between exciter and receiver; it is compatible with rather broad pulsing which serves to reduce the effect of long period reverberation. An essential part of the present invention is a repetitive sweep of the excitation frequency. In this regard, reference is made to the Franklin U.S. Pat. No. 3,568,661 which discloses simultaneous swept frequency excitation and reception at each site. Each of the transducers is connected to its driver and mixer-bandpass amplifier arrangement, both of the latter feeding a phase detector with the output thereof stated as being a measure of velocity. Although Franklin neither mentions nor claims frequency measurement, the "measure" is a frequency or period count by inference. Since the transducers of his invention do not invade the conduit (such as a blood vessel), his disregard of signals in the wall is unrealistic. As is shown in the mathematical theory below, only in the case of wall signals which are negligibly small compared with signals in the fluid is the frequency of a component in the phase detector output proportional to velocity magnitude, said frequency being given by:

$$\dot{f}(\tau_u - \tau_d)$$

where
$\dot{f}$ = rate of change of frequency, and
$\tau_d$, $\tau_u$ = downstream (upstream) delay.

Since the detector output component of frequency $\dot{f}$ $(\tau_d + \tau_u)$ has the same amplitude, one would then have to provide means for suppressing this component. However, this is not at all mentioned in Franklin and may not be practical in his apparatus. The numerical example given by Franklin is for a beat frequency of 10 Hz (maximum) and a resolution of 10 nanoseconds for the differential path delay, necessitating $\dot{f} = 10^9$ Hz/sec. for at least 0.1 sec., which corresponds to a deviation of 100 MHz. Franklin makes no statement concerning the response of transducers which resonate about 10 MHz to a 110 MHz signal. The Franklin invention has certain drawbacks associated therewith and may in fact not provide accurate and practical results.

MATHEMATICAL THEORY OF THE INVENTION

The invention is based on the interference between signals that travel in the fluid and signals that travel in the walls of the conduit. The amplitude of the received signal depends on the phase between the said group of signals. More specifically, if the excitation frequency is varied at the rate of f Hz/sec, the envelope or output of the peak detector at the receiving transducer has a periodic component. In downstream transmission, the period is measured as successive zero crossings of the envelope fluctuations, that is, the interval $t_2 - t_1$. This is related to the downstream delay $t_d$ in the fluid and the delay $t_w$ in the wall by equation (12) below. Similarly, the zero crossings interval $t_4 - t_3$ at the upstream transducer signal's envelope fluctuation is related to the upstream delay $t_u$ by equation (13). The ratio of fluid velocity v to the sound velocity c in the stationary fluid then follows from equation (15).

In sum, there are measured periods which determine the differential delays between signals in the wall and in the fluid, alternately downstream and upstream; and difference of the differential delays determined from the beat period measurements is $t_u - t_d$.

For electro-acoustic transducers 1 and 2 on a line AB which passes obliquely through the flow axis, such as, for example, as shown in FIG. 2, let,
c = sound velocity in the stationary fluid
v = fluid velocity resolved along AB
$\tau_u$ = time delay of sound traveling from A to B in the fluid,
$\tau_d$ = time delay of sound traveling from B to A in the fluid,
then $$\tau_d = AB/(c+v), \ \tau_u = AB/(c-v) \quad (1)$$

hence $$\tau_d/\tau_u = (c-v)/(c+v) \text{ or } v/c = (\tau_u - \tau_d)/(\tau_u + \tau_d) \quad (2)$$

In practice, the determination of the delays is complicated by the facts that the sound does not travel along the line AB from transducer to transducer exclusively even when collimated as in FIG. 1, and that electrical coupling between the exciter and receiver electronics cannot be entirely avoided. In non-invasive arrangements as in FIGS. 2 or 3, the fraction of sonic power which is coupled through the fluid may be much less than the total power coupled. Letting f = frequency of excitation
t = real time
$\tau_w$ = delay of composite (ensemble) of signals which couple the transducers outside the fluid
a = amplitude of signals through the fluid, normalized with regard to the signals which couple the transducers outside the fluid.

Then if the upstream transducer is excited by the harmonic signal which varies in time as $\cos(2\pi \int^t f\, dt)$, the signal received by the downstream transducer is $$e_d = \cos(2\pi \int^{t-\tau_w} f\, dt) + a \cos(2\pi \int^{t-\tau_d} f\, dt) \quad (3)$$

where the amplitude of the first term has been taken as unity (one volt) without loss of generality. In equation (3) the first term on the right hand side represents the signal in the wall and the second term represents the signal in the fluid. If the two signals differ in frequency, the sum $e_d$ is a "beat" signal whose peak value or amplitude fluctuates at the difference frequency; mathematically, the curve in osculatory contact with $e_d$ is the "envelope" of $e_d$, and is approximated in practice by the output of a peak detector which is driven by $e_d$. The fluctuating component of the envelope of $e_d$ will be analyzed next. By trigonometry, equation (3) can be written $$e_d = E_d \cos(\pi \int^{t-\tau_w} f\, dt + \pi \int^{t-\tau_d} f\, dt + \alpha_d) \quad (4)$$

where $$\tan \alpha_d = (1-a)/(1+a) \tan \tfrac{1}{2}\phi_d \quad (5)$$

$$E^2_d = 1 + a^2 + 2a \cos \phi_d \quad (6)$$

or $$E_d \approx 1 + a \cos \phi_d \text{ if } |a| << 1 \quad (7a)$$

$$\approx a + \cos \phi_d \text{ if } |a| << 1 \quad (7b)$$

The phase $\phi$ in the above is:

$$\phi_d = 2\pi \int_{t-\tau_d}^{t-\tau_w} f\, dt \quad (8)$$

If $f = f_o$, a constant, $\phi_d$ is constant if velocity is constant, and no meaningful information appears in the signal $e_d$. However, if the frequency f is varied linearly with time such that $$f = f_o + \dot{f} t \quad (9)$$

where $f_o$ and $\dot{f}$ are constant, then $$\phi_d = -2\pi(f_o(\tau_w - \tau_d) - \tfrac{1}{2}\dot{f}(\tau^2_w - \tau^2_d)) - 2\pi \dot{f} t(\tau_w - \tau_d) \quad (10)$$

Letting
$\Delta f$ = maximum deviation of the excitation frequency, then if $$|\Delta f(\tau_w - \tau_d)| > 1 \quad (11)$$

it follows that $E_d$ has a periodic component, which passes through zero in the same sense at successive instants $t_1$ and $t_2$, say; then $$\dot{f}(t_2 - t_1)(\tau_d - \tau_w) = 1 \quad (12)$$

For numerical illustration of equation (1), if $\tau_d - \tau_w = 20$ $\mu s$, then $\Delta f > 50$ KHz is required, so that the instantaneous excitation frequency must rise from below 9.975 MHz to beyond 10.025 MHz where the system has a midband frequency of 10 MHz. Similarly in upstream transmission, the period $t_4 - t_3$ of the received envelope is given by $$\dot{f}(t_4 - t_3)(\tau_u - \tau_w) = 1 \quad (13)$$

Eliminating $\tau_w$ between the last two equations, $$\tau_u - \tau_d = \frac{1}{\dot{f}}\left(\frac{1}{t_4 - t_3} - \frac{1}{t_2 - t_1}\right) \quad (14)$$

Combining equations (12) and (14) there follows:

$$v/c = k((t_2 - t_1) - (t_4 - t_3)) \quad (15)$$

The factor k in equation (15) is given by $$1/k = \dot{f}(\tau_u + \tau_d)(t_4 - t_3)(t_2 - t_1) \quad (16)$$

and is approximately constant if $|v| << c$.

The last two results are exact by the reciprocity theorem if the delays are non-dispersive in the frequency range of interest, and if $\tau_w$ is independent of v. In the case of distributed sound paths and/or nonuniform flow, v and c are ensemble averages.

The following is a further analysis of the mixing method disclosed in the Franklin patent. Several components exist in the mixer output; while most have been ignored by Franklin, they are likely to frustrate attempts at velocity measurement by mixing.

Thus, when the received signal of equation (3) is heterodyned with part of the transmitted signal $\cos 2\pi \int^t f\, dt$, the beat frequency output is, if instantaneous frequency f varies linearly with time, $$e_{d,m} = \cos(2\pi(f_o\tau_w + \dot{f}\tau_w(t - \tfrac{1}{2}\tau_w))) + a \cos(2\pi(f_o\tau_d + \dot{f}\tau_d(t - \tfrac{1}{2}\tau_d))) \quad (17)$$

Unless $\tau_w$ and $\tau_d$ differ greatly or $|a|$ is very great, the first component on the right hand side of (17) cannot be eliminated; if $|a|$ is very small, $\tau_d$ has little effect on $e_{d,m}$. When the signal received upstream is mixed with part of the excitation signal, the mixer output $e_{u,m}$ is given by the right hand side of (17) on replacing $\tau_d$ by $\tau_u$. If the product $e_{d,m} \cdot e_{u,m}$ is generated in a phase detector, seven terms are generated of different frequencies and relative amplitudes, as follows:

TABLE 1

| (phase detector periodic output components) | | | |
|---|---|---|---|
| relative amplitude | 1 | a, a | $a^2$ |
| frequency | $\dot{f}\tau_w$ | $\dot{f}(\tau_w \pm \tau_d)$ | $\dot{f}(\tau_w \pm \tau_u)$ | $\dot{f}(\tau_d \pm \tau_u)$ |

Hence unless $a^2 >> 1$, an unlikely situation in non-invasive arrangements, and unless $\tau_d + \tau_u >> \tau_u - \tau_d$, mixing techniques cannot generate extractable components of frequency $f(\tau_u - \tau_d)$.

DESIGN CRITERIA

In implementing the invention, the envelope detectors are to be supplied with signals which are nondispersive over the frequency range of interest. The swept excitation frequency is to remain within the system bandwidth defined by the transducer pair (also by the exciter and predetection receiver circuits), and sweep duration is to be substantially greater than the reciprocal half-bandwidth (radians/sec.), excepting the flyback of a sawtooth sweep. For example, if one-half of the bandwidth is 30 KHz, then the sweep duration should exceed 30 microseconds. Since acoustic transducers are naturally narrowband, two means of achieving adequate bandwidth will be described, design for staggered tuning and equalization by gain control.

The bandwidth of a given transducers can be increased by resistive damping, to W radians/sec., say. Then if each transducer has the same bandwidth W and resonances are separated by W, bandwidth for excitation of one transducer and reception by the other is $\sqrt{2}$ W (maximal flatness); these bandwidths are between the $-3$ dB responses.

Equalization is enhanced by controlling the excitation level and/or receiver gain by the sweep frequency. For instance, if excitation level is held constant, it is feasible to control past detection gain by the sweep waveform via a shaping network and voltage variable attenuator, the nonlinear characteristic of the shaping network being chosen to equalize frequency response.

Automatic gain control (AGC) is used in the predetection amplifier of the receiver section for proper operation of the envelope detector. The AGC voltage is provided by the output of the envelope detector via a lowpass filter of time constant substantially greater than the period $(t_2 - t_1)$, to preclude demodulation of the signal ensemble through the fluid. AGC voltage thus cannot serve response equalization.

Two modes of operation are available in the present invention, time division and duplex. In time division the transmit/receive role of each transducer is alternated sequentially, that is, one transducer receives while the other transmits; the time division mode reduces the problem of VCO noise masking the reception of signals through the fluid, but also halves the time available to track velocity and requires careful switch design. Duplex operation makes better use of the available bandwidth and obviates the switch, but requires hybrid transformers or their equivalent and suitable dummy loads to minimize the transmit signal breakthrough into the adjacent receive port; half of the total transmit power is dissipated in the dummy loads required for hybrid balance. Duplex operation according to the present invention is further enhanced for weak signals through the fluid by offsetting the excitation frequency of one transducer from the other, providing that adequate bandwidth is available.

BRIEF DESCRIPTION OF THE DRAWINGS

Numerous objects and advantages of the invention should now become apparent upon a reading of the following detailed description taken in conjunction with the accompanying drawings in which.

DETAILED DESCRIPTION

In accordance with the present invention, each of the differential time delays $\tau_w - \tau_d$ and $\tau_w - \tau_u$ are measured; their difference $\tau_u - \tau_d$ is then derived and displayed and is proportional to fluid velocity over a wide range of flow conditions.

Figure 3:
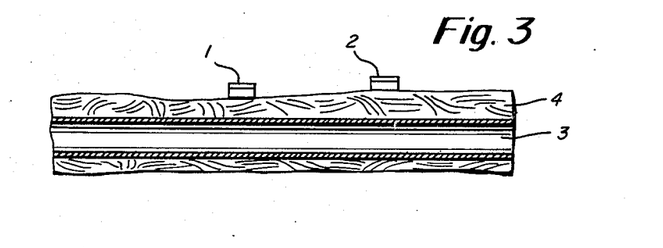

The nature of the invention will be described with reference to the drawings but is not restricted to the embodiments shown since those skilled in the art can readily device viable alternatives or variations which are contemplated as falling within the scope of the invention. FIGS. 1-3 show arrangements of the transducers 1 and 2 which have been referred to previously. These transducers, in particular in FIGS. 1 and 2, are located on a line intersecting the flow axis obliquely for a path through the fluid in conduit 3. In FIG. 1 extension arms 4 through the walls of a conduit section allow collimation of the sound in the moving fluid. In FIG. 2 a wedge of suitable material may be provided which enhances the sonic coupling of the transducers and the walls for exciting sound waves in the fluid. In FIG. 3 acoustic coupling between transducers and fluid is provided by the conduit wall and the surrounding layers, e.g. organic tissues or the like in case of blood flow measurement. The arrangement shown in FIGS. 2 and 3 are non-invasive. Flowmeters according to the present invention can be implemented with many types of electro-acoustic transducers, such as piezoelectric crystals, and in a wide range of frequency bands.

Figure 4:
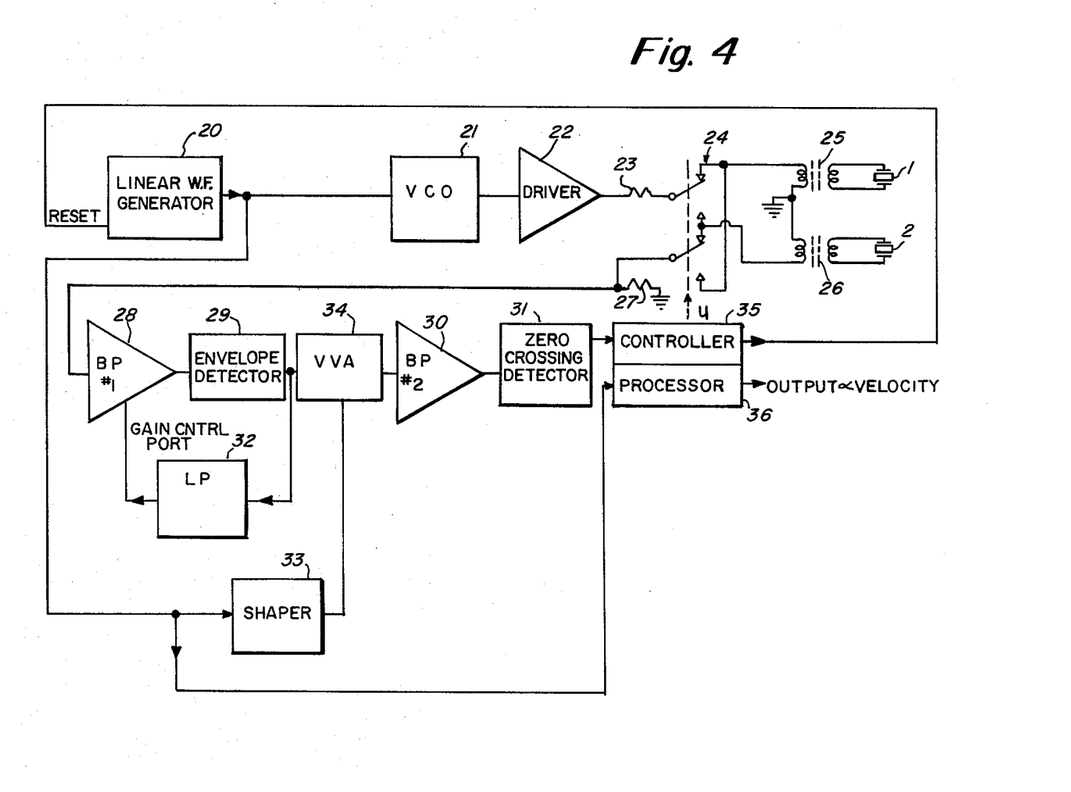
FIG. 4 is a circuit block diagram of one system in accordance with the present invention employing time division.

FIG. 4 shows a time division system for alternately exciting transducer 1 while receiving at transducer 2; and exciting transducer 2 while receiving at transducer 1. The exciter portion includes the linear waveform generator 20, the voltage controlled oscillator 21, and the driver 22. The receiver portion of the system includes bandpass amplifiers 28 and 30, zero crossing detector 31, and envelope detector 29. Two-pole, two-way switch 24 alternates the roles of the transducers according to the state of the controller 35. The transducers are connected via coupling transformers 25 and 26. The processor 36 provides the final output which is proportional to velocity.

Figure 5:
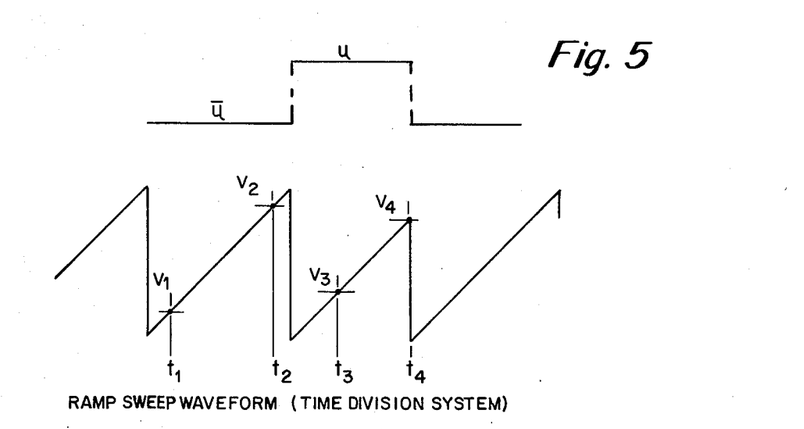
FIGS. 5 and 6 show waveforms associated with the time division system of FIG. 4 and in particular the linear waveform generator, including in FIG. 5 a ramp sweep waveform and in FIG. 6 a triangular sweep waveform.
Figure 6:
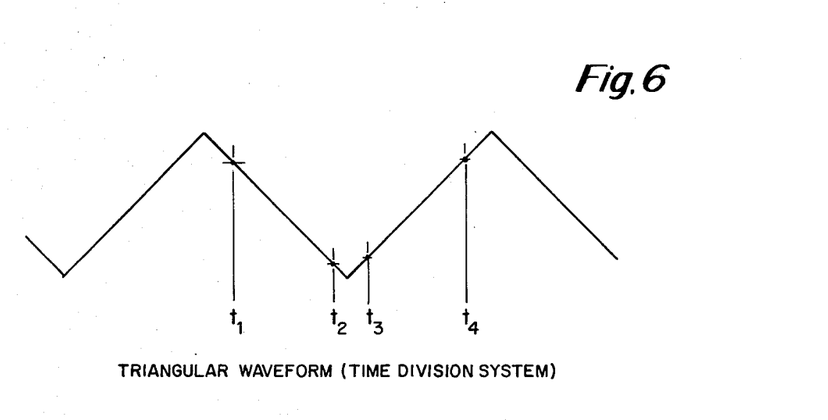

The linear waveform generator 20 has, in addition to its output, a reset input which couples from the controller 35. The generator 20 generates a repetitive sawtooth as shown in FIG. 5, or a triangular waveform as shown in FIG. 6. These waveforms are generated in a free running mode which is reset usually from a pulse from the controller 35, whereafter the sweep commences over again. The output from the linear waveform generator 20 couples to the voltage controlled oscillator 21 for modulating the frequency output thereof. The output from the voltage controlled oscillator (VCO) 21 is coupled to driver 22. The output from the driver couples by way of a damping resistor 23 to one arm of the switch 24. Alternatively, the resistor 23 could be a shunt to ground depending upon the output resistance of the driver 22. The received signal is coupled out at the other arm of the switch 24 and is applied to the bandpass amplifier 28. There is preferably provided a damping resistor 27 which is coupled to ground to provide proper damping of the receiving transducer 2. The bandpass amplifier 28 has the gain required for proper operation of the envelope detector 29 over the excitation frequency band. The other bandpass or video amplifier 30 is driven by the detector 29 through a voltage variable attenuator 34. The output of the envelope detector 29 also drives a lowpass filter 32 which is part of the gain control loop. The gain control part of the bandpass amplifier 28 is connected to the output of the lowpass filter 32. The voltage variable attenuator 34 aids in the equalization of the frequency response. The attenuator is driven by way of a shaping network 33 from the generator 20. The shaping network is designed with a suitably chosen non-linear voltage transfer characteristic. The video amplifier 30 accommodates the frequency band of $|\dot{f}(\tau_w - \tau_u)|$ and $|\dot{f}(\tau_w - \tau_d)|$. Zero crossing detector 31 is driven by the output from the bandpass amplifier 30; the rate of the zero crossing is $\dot{f}|\tau_w - \tau_u|$ in upstream transmission and $\dot{f}|\tau_w - \tau_d|$ in downstream transmission.

Figure 7:
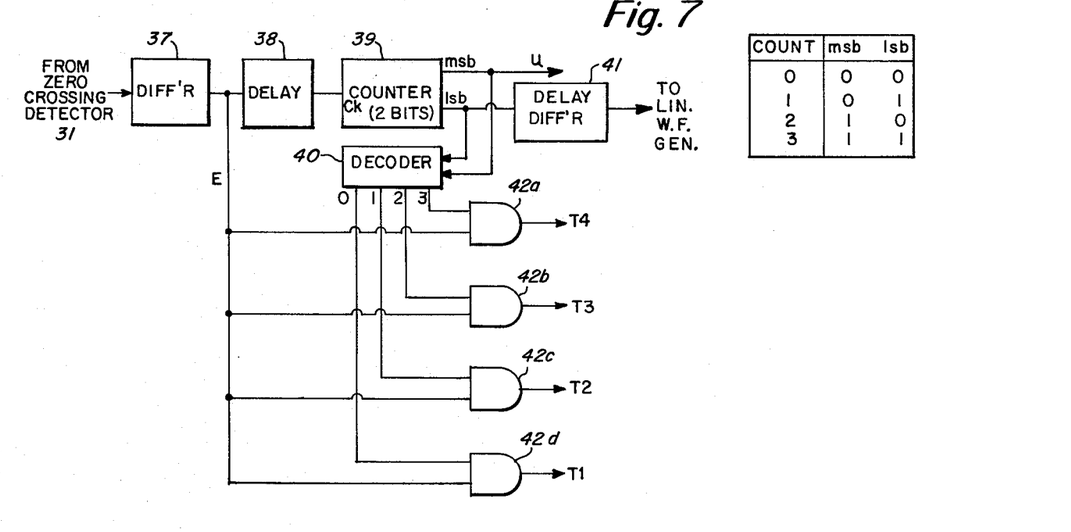
FIG. 7 is a circuit block diagram including a table for the controller shown in FIG. 4.

Reference is now made to FIG. 7 which shows a specific detail for the controller 35 of FIG. 4. This controller is preferably employed with a voltage sweep as depicted in FIG. 5. FIG. 7 shows the output from zero crossing detector 31 coupling to a differentiator 37 which may be a one-shot. The signal is then delayed by delay device 38 which, for example, could be a pair of one-shots. This signal then clocks the two-bit counter 39. The counter 39 may be a conventional binary ripple counter device. FIG. 7 also shows a table with counts and the corresponding binary signals from the two outputs msb and lsb. The most significant bit (msb) of counter 39 controls the position of switch 24. This is referred to as the signal u. Note that this also couples to FIG. 4 and is depicted illustratively as controlling the position of switch 24. The convention used is that up=msb and down=$\overline{\text{msb}}$. This signal is also shown in FIG. 5 above the ramp waveform.

In FIG. 7 the rising edge of the least significant bit (lsb) from the counter 39 is delayed and differentiated in device 41 to recommence the sweep of the waveform generator 20. This is the line shown in FIG. 4 coupling from the controller to the reset input of the ramp waveform generator 20. The count represented by the counter 39 is fully decoded by the decoder device 40 which may be of conventional design. The decoder device provides output lines 0–3 which go high at respective times t1, t2, t3, t4. These lines feed respective AND gates 42a, 42b, 42c, and 42d. Each of these AND gates also have a common input which is the differentiated positive zero crossing signal taken from differentiator 37. The outputs of the gates are designated as the signals T1, T2, T3 and T4.

Figure 8:
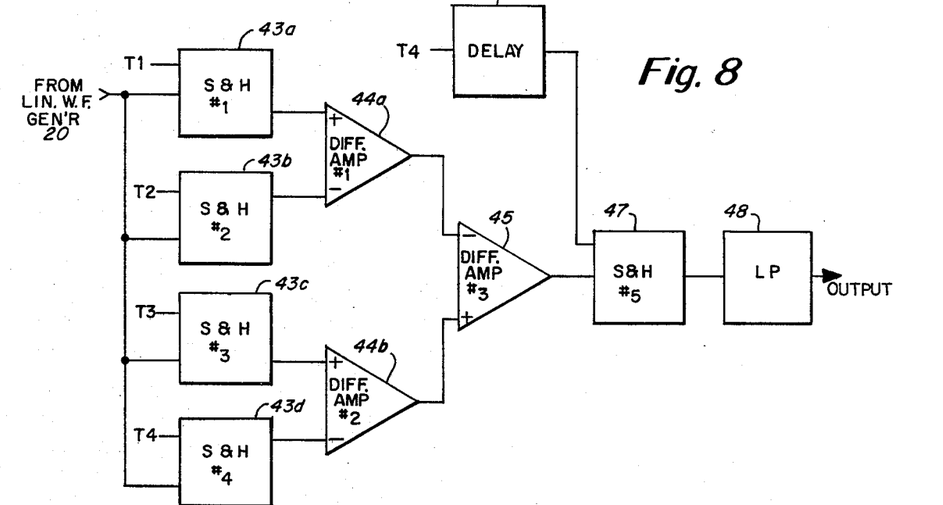
FIG. 8 is an electrical block diagram of the processor shown in FIG. 4.

FIG. 8 shows a detail of one version of a processor 36 depicted in FIG. 4. The processor includes five sample and hold circuits, three differential amplifiers, a delay circuit and a lowpass filter. The signals T1–T4 of FIG. 7 are coupled to the sample and hold circuits 43A, 43B, 43C, and 43D. These sample and hold circuits also receive a common input from the linear waveform generator 20. Thus, the linear waveform is essentially being sampled by these circuits at the times detected by the control circuit shown in FIG. 7. The differential amplifiers 44A and 44B from outputs proportional to $t_1 - t_2$ and $t_4 - t_3$, respectively. Also, the signal T4 is delayed in the delay device 46 to sample the output of differential amplifier 45 in the additional sample and hold circuit 47. The output voltage of device 47 is proportional to velocity and is smoothed in a final lowpass filter 48. The differential amplifier 45 forms a velocity proportional voltage, see equation (15).

Figure 9:
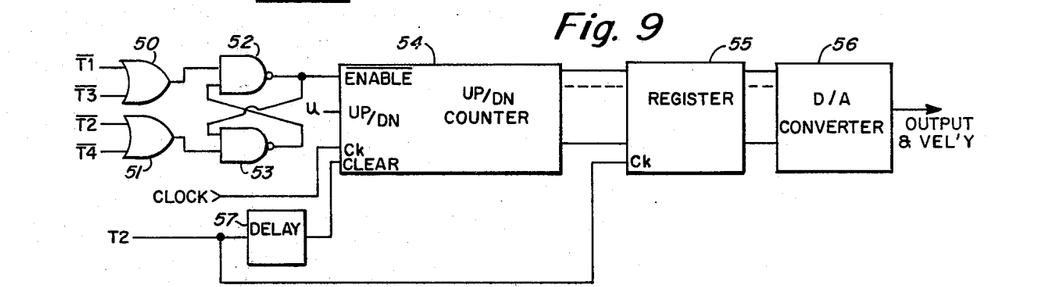
FIG. 9 is a logic block diagram for an alternate digital version of the processor shown in FIG. 4.

A digital implementation for processor 36 of FIG. 4 is shown in FIG. 9. The up/down counter 54 is enabled by the inverted outputs which are taken from gates 42 of FIG. 7 via OR gates 50, 51 and cross-coupled NAND gates 54, 53 during the intervals $t_2 - t_1$ and $t_4 - t_3$. The counting sense of the counter 54 is determined by the signal u (most significant bit of counter 39). The clock is a frequency stable oscillator (not shown) of suitable rate, such as, for example, 100 MHz for 10 ns resolution. The counter 54 is cleared to zero by the signal T2 after delay through delay device 57. This delay is required for transfer of the count in counter 54 to register 55. It is noted that the signal T2 also causes the transfer to the register 55. The digital-to-analog converter 56 at the output of register 55 generates an output voltage proportional to velocity.

Figure 10:
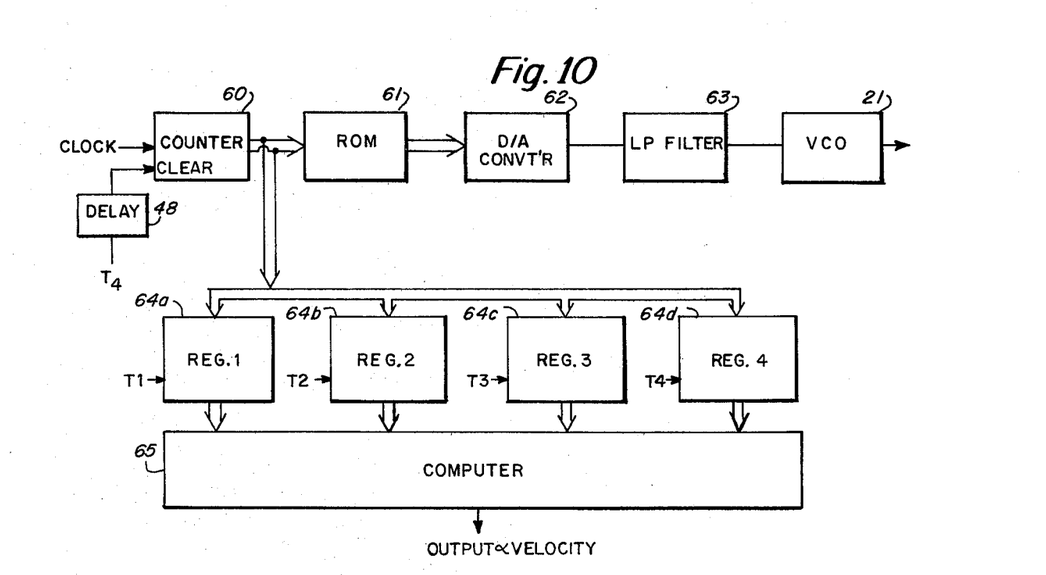
FIG. 10 is a logic block diagram showing the use of a computer and including digital sweep and processing circuitry.

Digital means of sweeping and processing are shown in FIG. 10. A clock of suitably high rate drives counter 60 with the counter 60 being cleared or reset by the signal T4 through a delay 48. The count from counter 60 is applied to register 64 having stages 64A, 64B, 64C and 64D. The output from counter 60 is also coupled to the read only memory (ROM) 61. The ROM is programmed to ensure linear frequency modulation of the VCO (voltage controlled oscillator) 21. First, however, the signal is coupled through a D to A converter 62 and a low-pass filter 63. This arrangement alleviates the need of shaping circuitry in the VCO for linearizing the frequency modulation characteristic. The register stages are clocked at respective times T1, T2, T3, and T4, to receive the count from counter 60. The register contents are then coupled to a conventional computer 65 such as a commercially available microprocessor with the output number therefrom being proportional to velocity.

Figure 10A:
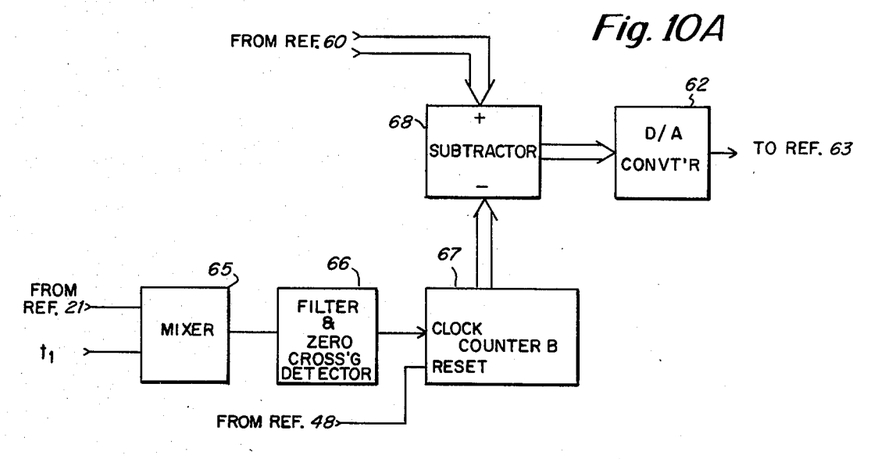
FIG. 10A shows an alternate block diagram for a portion of the system of FIG. 10 employing a feedback arrangement for linearizing the digital sweep.

FIG. 10A shows a feedback loop for linearizing the frequency sweep. This diagram shows a subtractor 68 which has its input coupled from the counter 60 described previously in FIG. 10. There is also provided a mixer 65 and a filter 66 which couples to counter 67. The mixer 65 receives a fixed frequency F1 and the frequency from the VCO 21. This circuitry generates a beat between these two frequencies. The counter 67 is clocked by the output from the filter and zero crossing detector 66. The subtractor 68 is fed by counters 60 and 67. The output from the subtractor couples to a digital-to-analog converter 62. The subtractor 68 provides a difference count corresponding to the two counts received from the counters 60 and 67. The output from the converter 62 feeds a lowpass filter 63 at the tuning port of the voltage controlled oscillator 21. The circuits shown in FIG. 10A linearizes the frequency deviation with regard to time notwithstanding a non-linear frequency modulation characteristic of the VCO 21.

Figure 11:
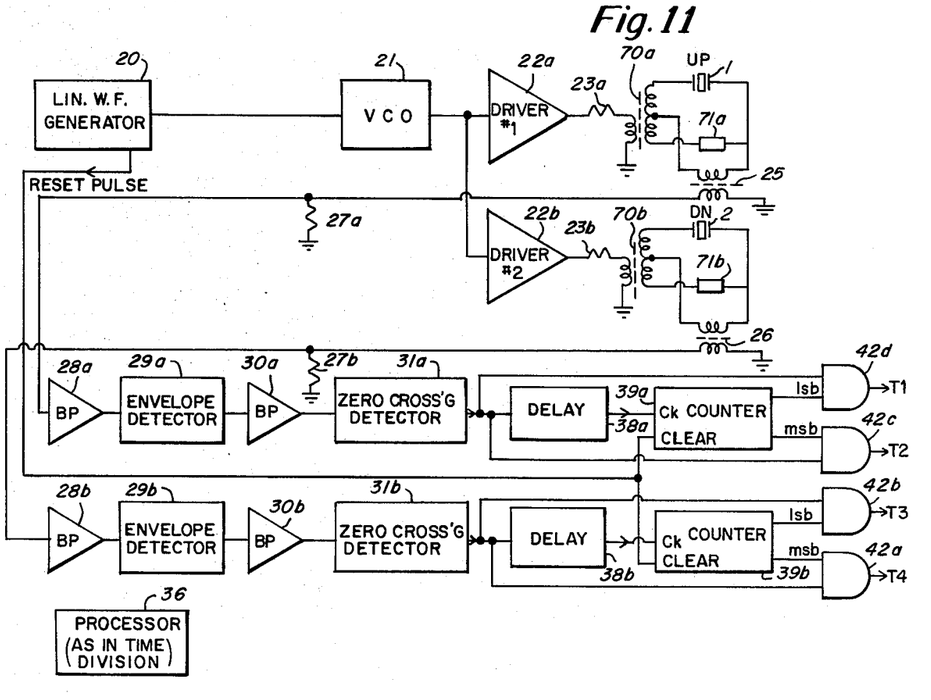
FIG. 11 is an electrical block diagram of an alternate version of the invention employing a duplex system for transducer operation and preferably employing a processor similar to that described previously.

FIG. 11 shows an alternate embodiment of the present invention in the form of a duplex system. In FIG. 11 like reference characters have been employed where applicable in comparison with the previous embodiment of FIG. 4. Thus, in FIG. 11 there is shown an exciter section which includes a linear waveform generator 20, a VCO 21, and two drivers 22A and 22B. These drivers have associated therewith respective damping resistors 23A and 23B which feed transformers 70A and 70B, respectively. The receive section includes components similar to those shown in FIG. 4 such as bandpass amplifiers 28A, 28B, envelope detectors 29A, 29B, video amplifiers 30A, 30B, and zero crossing detectors 31A, 31B. For the sake of clarity other components that may be used have been omitted such as the automatic gain control loop of FIG. 4. Such a loop may also be employed in the circuit of FIG. 11.

In FIG. 11 the controller includes delays 38A, 38B, counters 39A, 39B, and output gates 42A, 42B, 42C and 42D. The processor 36 of FIG. 11 may be the same as that used in FIG. 4 and may take the form shown in FIG. 9 or FIG. 10.

Hybrid transformers 70A, 70B couple the drivers 22A, 22B to their respective transducers and associated dummy loads. The transducers in FIG. 11 are identified as up transducer 1 and down transducer 2. The dummy loads are 71A and 71B. These dummy loads ideally have the same impedance as the transducers, and in their simplest form are resistors of values matching the loaded series resistances of the transducers. The other transformers 25 and 26 coupled to the taps of transformers 70A, 70B feed inputs to the receive sections at the bandpass amplifiers 28A, 28B.

Figure 12:
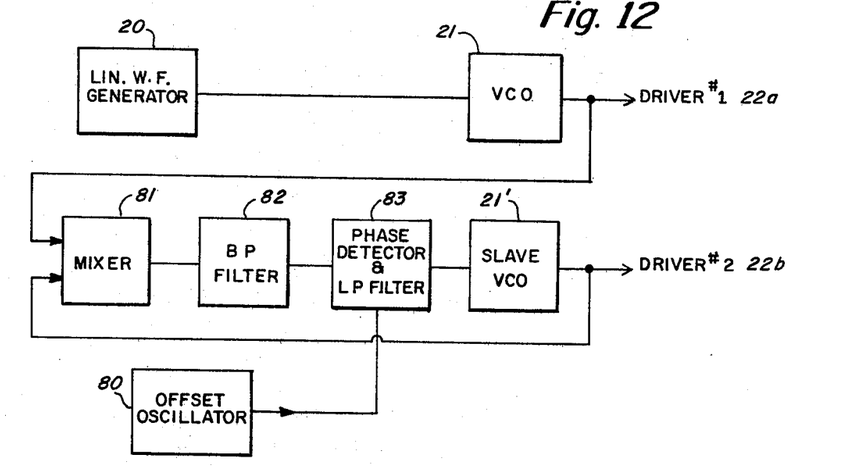
FIG. 12 is a block diagram of an alternate portion of the system of FIG. 11 employing an exciter with master/slave oscillators.

FIG. 12 illustrates an alternate form of duplex operation including two-frequency excitation. In the arrangement of FIG. 12 the voltage controlled oscillators 21 and 21' excite the respective drivers 22A, 22B associated with transducers 1 and 2. The slave VCO 21' is offset by a fixed frequency from the VCO 21. This offset frequency is determined by the oscillator 80. The offset is effected by a phase locked loop comprising mixer 81, bandpass filter 82 which selects the beat frequency, and phase detector and lowpass filter 83. The phase detector output supplies the voltage required at the tuning port of VCO 21' to ensure that oscillator frequencies differ accurately by the offset frequency during sweeps.

Figure 13:
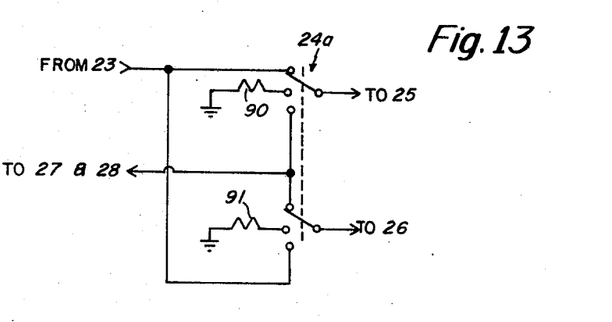
FIG. 13 shows an alternate transducer switch arrangement for intermittent operation.

In FIG. 4 there was depicted a two-position switch 24. An alternate arrangement is shown in FIG. 13 employing a three-position switch 24A which allows pulses or intermittent operation in accordance with the present invention. Between sweeps the arms of switch 24A are grounded, thus grounding the transducers 1 and 2 through transformers 25 and 26, respectively; please refer to FIG. 4. There also are provided resistors 90 and 91 for ground return.

Figure 14:
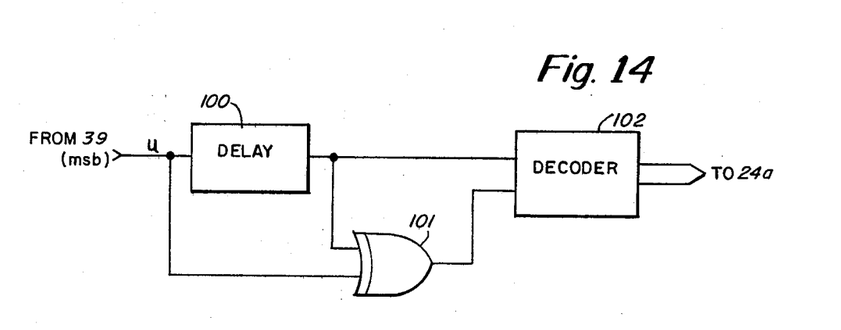
FIG. 14 shows a controller variation for intermittent operation.

FIG. 14 is a block diagram showing a means of controlling the three-position switch and FIG. 13 in conjunction with controller 35 shown in FIG. 7. The most significant bit output from the counter 39 is shown coupled to delay 100. There is also provided an exclusive OR gate 101 and decoder 102 which has three output states. The signal from gate 101 is high only during an interval determined by delay 100 following a change in the most significant bit from counter 39; the high state of the exclusive OR gate selects the ground position of switch 24A. Other methods of keying the excitation in accordance with the present invention should be readily apparent to those skilled in the art.

What is claimed is:

1. A system for measuring the velocity of fluid flow in a conduit comprising
    first and second transducers spaced apart upstream and downstream of the fluid flow,
    means for establishing an excitation signal of frequency that linearly varies with time,
    means coupling the excitation signal to the transducers,
    means coupled from the transducers for amplifying and detecting the received excitation signal including envelope detector means,
    means responsive to envelope fluctuations for measuring a first period due to interference in the signal received downstream between two groups of sounds, that have travelled from the upstream transducer to the downstream transducer in the conduit wall and in the fluid, respectively, and a second period due to interference in the signal received upstream between two groups of sounds that have travelled from the downstream transducer to the upstream transducer in the conduit wall and in the fluid respectively,
    and means responsive to a difference in the two periods for providing a signal proportional to fluid velocity.

2. A system as set forth in claim 1 wherein the transducer coupling means comprise means for alternately transmitting excitation signals upstream and downstream.

3. A system as set forth in claim 1 wherein the transducer coupling means comprise means for simultaneously transmitting excitation signals upstream and downstream.

4. A system as set forth in claim 3 including means for transmitting excitation signals of frequency offset by a fixed frequency.

5. A system as set forth in claim 1 including at least one damping resistor associated with each transducer for flattening the frequency response.

6. A system as set forth in claim 1 including a coupling transformer associated with each transducer for isolation and for matching signals to and from the transducer.

7. A system as set forth in claim 1 wherein said means for amplifying and detecting includes automatic level or gain control.

8. A system as set forth in claim 1 wherein said means for amplifying and detecting includes a bandpass filter for selecting the frequency spectrum of the received signal.

9. A system as set forth in claim 1 including a second bandpass or video amplifier to select the frequency spectrum of the envelope fluctuations.

10. A system as set forth in claim 1 including a zero crossing detector having its input coupled from the envelope detector means for detecting crossing of the envelope fluctuations through a specific predetermined level.

11. A system as set forth in claim 1 including means for shaping the modulation waveform and/or means for controlling the gain or attenuation of the detected envelope by the modulation waveform to compensate the frequency response.

12. A system as set forth in claim 1 wherein said means for establishing an excitation signal includes means for modulating the excitation signal digitally.

13. A system as set forth in claim 1 wherein said means for establishing an excitation signal includes sweep means and means for reinitiating the sweep, including means for sensing a zero crossing.

14. A system as set forth in claim 1 wherein said means for providing the signal proportional to velocity does so in accordance with the equation $$v/c = k((t_2 - t_1) - (t_4 - t_3))$$

where
- $v$ = fluid velocity
- $c$ = sound velocity
- $t_2 - t_1$ = period of envelope fluctuations in downstream transmission
- $t_4 - t_3$ = period of envelope fluctuations in upstream transmission
- $k$ = constant.

15. A system as set forth in claim 14 wherein said means for amplifying and detecting includes a zero crossing detector and said means responsive to envelope fluctuations includes a counter means and decoding means for providing time signals corresponding to $t_1$, $t_2$, $t_3$ and $t_4$.

* * * * *